UNITED STATES PATENT OFFICE.

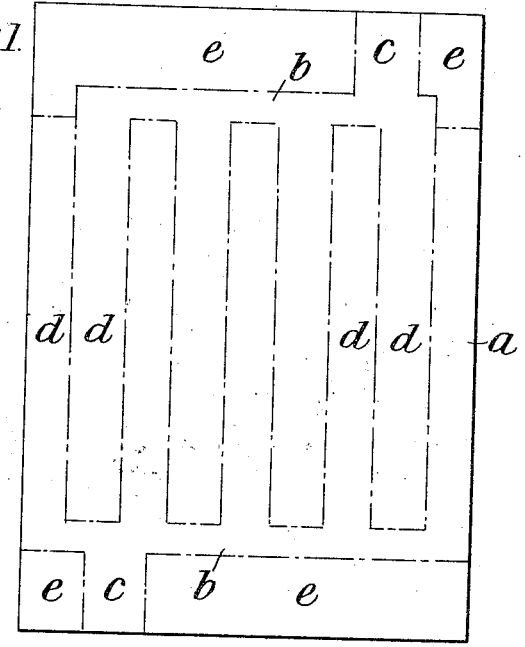
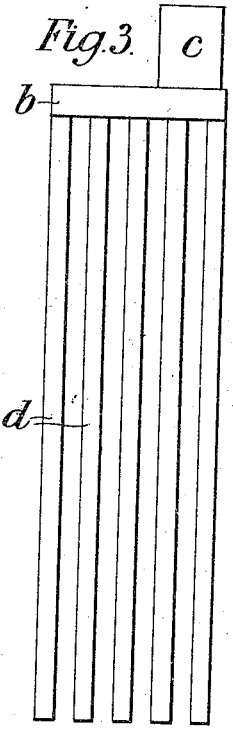
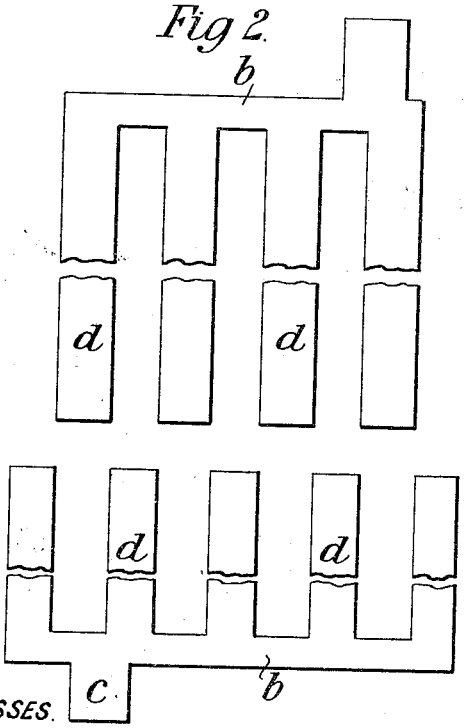
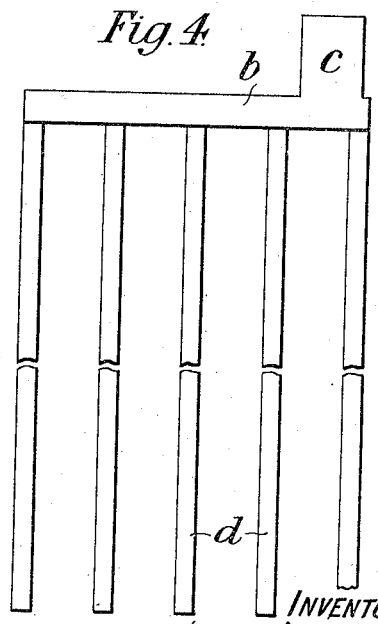

HENRY LEITNER, OF WESTMINSTER, LONDON, AND WILLIAM HERBERT EXLEY, OF HAREHILLS, LEEDS, ENGLAND.

MANUFACTURE OF ELECTRIC ACCUMULATORS.

1,327,336.

Specification of Letters Patent.

Patented Jan. 6, 1920.

Original application filed April 15, 1919, Serial No. 290,361. Divided and this application filed August 12, 1919. Serial No. 317,038.

*To all whom it may concern:*

Be it known that we, HENRY LEITNER, of 3 Victoria street, Westminster, London, England, and WILLIAM HERBERT EXLEY, of 10 Roundhay Place, Harehills, Leeds, England, electrical engineers, having invented certain new and useful Improvements in the Manufacture of Electric Accumulators do hereby declare that the following is a full, clear, and exact description of the same.

The present application is a division of our former application Serial No. 290,361, filed Apr. 15, 1919.

Our invention relates to the manufacture of electric accumulators, particularly those of the lead sulfuric acid bi-polar type, the object of our invention being to produce such accumulators more economically and expeditiously than heretofore.

According to our invention we reduce to a minimum the amount of waste or scrap which results from forming the lead collector bars, connecting lugs and streamers (these parts, for convenience of description, being hereinafter referred to collectively as a lead member) by constructing both the lead members required for an element or cell from a piece of sheet lead the area of which is only slightly greater than would be required for the formation of a single lead member one lead member constituting a complement of the other.

Our invention will be readily understood by reference to the accompanying drawings, in which:—

Figure 1 is a diagram illustrating the method of cutting out the lead members, and Fig. 2 shows the two members cut out and separated from one another.

Figs. 3 and 4 are views, hereinafter referred to, illustrating a method of forming the lead elements slightly varied from that illustrated in Figs. 1 and 2.

In producing the lead members we proceed as follows, that is to say, we take a piece $a$ (Fig. 1) of sheet lead of a thickness corresponding to that desired for the collector bars, of a width approximately that of the combined width of the positive and negative streamers and of a length approximately half that ultimately desired for the streamer and we cut or punch this sheet on the dotted lines indicated in Fig. 1, so that the two lead members, each having a collector $b$, a lug $c$, and a series of streamers $d$, $d$, are formed, as shown in Fig. 2, the only scrap or waste being the portions $e$, $e$ Fig. 1 due to the formation of the lugs.

The streamers are then rolled out so as to increase their length and at the same time reduce their thickness, the finished streamers after rolling being of any desired section as for example parallel or tapering from the thickness of the collector bar to any desired minimum and further the rolling may impress any desired pattern such as herring bone upon the streamers by making the rollers with such pattern upon them. If the centers of the streamers do not exactly coincide with the centers of the recesses for the active material in the support the collector bars are also rolled out so as slightly to lengthen them.

The streamers thus produced are then twisted, or they may be stamped into a grid-like form, that is to say in such a way that the horizontal ribs are pressed out alternately in opposite direction, thus constituting an additional lock for the active material.

The collector bars of the conductors are held in position by the saw-cuts in the top cross-bar or in the top and bottom cross-bars, as the case may be, and are reinforced where necessary by additional strips of wood. As a further security they may be riveted with lead or antimony-lead rivets to the cross-bar or bars.

In an alternative mode of forming the lead members, the plate may be formed with a thickened portion corresponding to the position of the collector bars $b$, and the thinner portion corresponding to the position and full length of the streamers $d$. After the lead members have been cut out in the manner illustrated in Fig. 1, to the form shown in Fig. 3, the thicker collector bar portions $b$ can where necessary be rolled to separate the streamers to the desired extent, as shown in Fig. 4.

Claims:

1. In the manufacture of electric accumulators, the method of forming the lead members from a single piece of sheet lead having parallel side edges, which consists in slitting the piece longitudinally and transversely to simultaneously form a plurality of complementary lead members having collector bars provided on one side with lugs and on the other side with series of streamers, and then rolling the streamers to flatten and lengthen the same.

2. In the manufacture of electric accumulators, the method of forming the lead members from a single piece of sheet lead having parallel side edges and thickened portions near its ends, which consists in slitting the piece longitudinally and transversely to simultaneously form a plurality of complementary lead members having collector bars provided on one side with lugs and on the other side with streamers, and then rolling the thickened portions forming the collector bars to flatten and lengthen the same.

3. A method of making lead members for an accumulator of the bi-polar type from a piece of sheet lead, consisting in cutting through the sheet from each end and both sides to provide lugs at the ends of collector bars, which extend across the sheet, simultaneously cutting the sheet along a zig-zag line to provide a series of streamers extending from each collector bar, and then rolling the streamers to flatten and lengthen the same.

4. A method of making lead members for bi-polar accumulators from an oblong sheet of lead, consisting in cutting the extremities along lines extending in from each side edge and end to provide lugs at the end of the sheet, also intermittently slitting the sheet transversely along lines located near the ends of the sheet, and cutting the sheet longitudinally along lines extending from the intermittent slits near one end of the sheet to the intermittent slits near the other end of the sheet to provide streamers, and then rolling the streamers to flatten and lengthen the same.

HENRY LEITNER.
WILLIAM HERBERT EXLEY.